(12) United States Patent
Matsuoka (10) Patent No.: US 10,862,372 B2
(45) Date of Patent: Dec. 8, 2020

(54) DRIVING APPARATUS FOR VEHICLE

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

(*) Notice: Subject to any disclaimer, the term of this patent is extended or adjusted under 35 U.S.C. 154(b) by 71 days.

(21) Appl. No.: 16/276,271

(22) Filed: Feb. 14, 2019

(65) Prior Publication Data

US 2019/0305641 A1    Oct. 3, 2019

(30) Foreign Application Priority Data

Mar. 28, 2018   (JP) .................... 2018-061146

(51) Int. Cl.
*H02K 9/19* (2006.01)
*F16H 45/02* (2006.01)
*F16H 41/24* (2006.01)
*H02K 7/102* (2006.01)
(Continued)

(52) U.S. Cl.
CPC ............. *H02K 9/19* (2013.01); *F16H 41/24* (2013.01); *F16H 45/02* (2013.01); *H02K 7/1025* (2013.01); *H02K 7/1085* (2013.01); *H02K 7/116* (2013.01); *F16H 2041/246* (2013.01); *F16H 2045/0215* (2013.01)

(58) Field of Classification Search
CPC ....... F16H 2041/246; F16H 2045/0215; F16H 41/24; F16H 45/02; H02K 7/1025; H02K 7/1085; H02K 7/116; H02K 9/19; H02K 7/006

USPC .......................................... 310/54
See application file for complete search history.

(56) References Cited

U.S. PATENT DOCUMENTS

| | | | | |
|---|---|---|---|---|
| 2003/0057004 A1* | 3/2003 | Morishita | ............. | B60K 6/485 180/65.26 |
| 2005/0017588 A1* | 1/2005 | Yamaguchi | ............. | B60L 50/15 310/156.45 |

(Continued)

FOREIGN PATENT DOCUMENTS

| | | | | |
|---|---|---|---|---|
| GB | 963105 A | * | 7/1964 | ............. F16D 57/04 |
| GB | 1028499 A | * | 5/1966 | ............. F16H 47/07 |

(Continued)

OTHER PUBLICATIONS

Non-Final Office Action of the U.S. Appl. No. 16/276,205, dated Mar. 24, 2020, 11 pp.

(Continued)

*Primary Examiner* — Alex W Mok
(74) *Attorney, Agent, or Firm* — United IP Counselors, LLC (57) ABSTRACT

A driving apparatus for a vehicle is disclosed. The driving apparatus is used for transmitting drive force to a first output shaft. The driving apparatus includes a housing, a motor, a torque converter and an oil reservoir unit. The housing includes a first oil chamber and a second oil chamber. The motor is disposed in the first oil chamber. The torque converter forms the second oil chamber and transmits drive force of the motor to the first output shaft. The oil reservoir unit is disposed radially inward of the torque converter. The torque converter guides hydraulic oil from the oil reservoir unit to the second oil chamber by centrifugal force.

8 Claims, 3 Drawing Sheets

(51) Int. Cl.
*H02K 7/116* (2006.01)
*H02K 7/108* (2006.01)

(56) References Cited

U.S. PATENT DOCUMENTS

| | | | |
|---|---|---|---|
| 2005/0035675 A1* | 2/2005 | Yamaguchi | B60L 58/12 |
| | | | 310/68 R |
| 2005/0133328 A1* | 6/2005 | Masuya | B60K 6/48 |
| | | | 192/3.3 |
| 2010/0078281 A1 | 4/2010 | Kajigai et al. | |
| 2010/0087290 A1 | 4/2010 | Schoenek et al. | |
| 2010/0273603 A1 | 10/2010 | Roses et al. | |
| 2011/0086739 A1 | 4/2011 | Kajigai et al. | |
| 2011/0240428 A1* | 10/2011 | Fujikane | B60K 6/48 |
| | | | 192/3.28 |
| 2011/0263370 A1 | 10/2011 | Borntraeger et al. | |
| 2012/0071294 A1 | 3/2012 | Ishikawa | |
| 2012/0073924 A1* | 3/2012 | Fukatsu | F16H 61/143 |
| | | | 192/3.3 |
| 2012/0178568 A1 | 7/2012 | Schoenek et al. | |
| 2013/0035202 A1* | 2/2013 | Ideshio | B60K 6/46 |
| | | | 477/5 |
| 2013/0111891 A1* | 5/2013 | Iwase | F02B 63/042 |
| | | | 60/347 |
| 2013/0310216 A1* | 11/2013 | Kamiya | B60K 6/48 |
| | | | 477/5 |
| 2014/0094340 A1 | 4/2014 | Yoshikawa et al. | |
| 2014/0144742 A1 | 5/2014 | Sperrfechter et al. | |
| 2014/0230423 A1 | 8/2014 | Iwase et al. | |
| 2016/0052379 A1* | 2/2016 | Inoue | B60K 6/387 |
| | | | 74/661 |
| 2016/0109010 A1 | 4/2016 | Lindemann et al. | |
| 2017/0276242 A1* | 9/2017 | Matsubara | F16D 48/06 |
| 2017/0328455 A1 | 11/2017 | Li et al. | |
| 2018/0163837 A1* | 6/2018 | Sato | F16H 41/24 |
| 2018/0201269 A1* | 7/2018 | Matsubara | B60W 10/02 |
| 2019/0301581 A1 | 10/2019 | Matsuoka | |
| 2019/0305698 A1 | 10/2019 | Matsuoka | |
| 2019/0376589 A1 | 12/2019 | Samie et al. | |
| 2020/0047611 A1 | 2/2020 | Matsuoka | |

FOREIGN PATENT DOCUMENTS

| | | |
|---|---|---|
| JP | 2011-231857 A | 11/2011 |
| JP | 2018-009680 A | 1/2018 |

OTHER PUBLICATIONS

Non-Final Office Action of the U.S. Appl. No. 16/275,733, dated Aug. 20, 26 pp.

* cited by examiner

DRIVING APPARATUS FOR VEHICLE

CROSS-REFERENCE TO RELATED APPLICATIONS

This application claims priority to Japanese Patent Application No. 2018-061146, filed Mar. 28, 2018. The contents of that application are incorporated by reference herein in their entirety.

TECHNICAL FIELD

The present disclosure relates to a driving apparatus for a vehicle. More particularly, the present disclosure relates to a driving apparatus for a vehicle which is used for transmitting drive force to an output shaft.

BACKGROUND ART

A conventional driving apparatus for a vehicle includes a motor generator (electric motor) and a torque converter, as described in Japanese Patent Unexamined Publication No. 2011-231857.

BRIEF SUMMARY

With the conventional driving apparatus for a vehicle, the torque converter is supplied with hydraulic oil by the oil pump and the valve body. The hydraulic oil is used as both hydraulic oil for the torque converter and cooling oil for cooling the motor generator.

With a conventional driving apparatus for a vehicle, there is a need to prepare the oil pump and the valve body in order to supply the torque converter and the motor generator with hydraulic oil (cooling oil). Because of this, the structure of the driving apparatus in the conventional driving apparatus for a vehicle becomes complex and may cause the driving apparatus to increase in size.

The present advancement has been made in light of the above-mentioned problem and it is an object of the present advancement to provide a driving apparatus for a vehicle that is capable of guiding hydraulic oil with a simple configuration. It is also an object of the present advancement to provide a driving apparatus for a vehicle that can be reduced in size.

A driving apparatus for a vehicle according to one aspect of the present advancement is a device used for transmitting drive force to an output shaft. The driving apparatus for a vehicle includes a housing, an electric motor, a torque converter and an oil reservoir unit.

The housing includes a first oil chamber and a second oil chamber. The electric motor is disposed in the first oil chamber. The torque converter forms the second oil chamber and is configured to transmit drive force of the electric motor to the output shaft. The oil reservoir unit is disposed radially inward of the torque converter. In the present device, the torque converter guides hydraulic oil from the oil reservoir unit to the second oil chamber by centrifugal force.

With the present driving apparatus for a vehicle, the torque converter guides hydraulic oil from the oil reservoir unit to the second oil chamber by applying centrifugal force to the hydraulic oil when the torque converter operates. In this way, with the present driving apparatus, hydraulic oil can be guided from the oil reservoir unit to the second oil chamber, without any other prepared devices for guiding hydraulic oil, for example, a pump and a control device for the pump. In other words, according to the present driving apparatus for a vehicle, hydraulic oil can be guided with a simple configuration and the size of the device can be reduced.

In the driving apparatus for the vehicle according to another aspect of the present advancement, the torque converter preferably includes a case unit that forms the second oil chamber. In this case, a first oil passage that allows the hydraulic oil to flow from the second oil chamber to the first oil chamber is formed in the case unit.

According to this configuration, hydraulic oil can be guided from the second oil chamber to the first oil chamber with a simple configuration.

In the driving apparatus for the vehicle according to another aspect of the present advancement, a pressure regulating valve is preferably provided in the first oil passage. In this case, the pressure regulating valve permits or restricts passage of the hydraulic oil in the first oil passage according to a difference in pressure between the first oil chamber and the second oil chamber.

According to this configuration, hydraulic oil can be held in the case unit when the torque converter has stopped operating.

In the driving apparatus for the vehicle according to another aspect of the present advancement, the electric motor preferably includes a first stator fixed to the housing, and a first rotor configured to rotate relative to the first stator. In this case, the torque converter includes an impeller configured to rotate integrally with the first rotor, a turbine configured to connect to the output shaft, and a second stator configured to rotate relative to the housing.

Through configuring the torque converter in this way, drive force of the electric motor can be suitably transmitted to the output shaft.

In the driving apparatus for the vehicle according to another aspect of the present advancement, the electric motor preferably includes a first stator fixed to the housing and a first rotor configured to rotate relative to the first stator. The first stator includes a coil unit. In this case, the first oil passage is formed in the case unit so that the hydraulic oil cools the coil unit when centrifugal force acts on the hydraulic oil.

With this configuration, the coil unit of the first stator can be suitably cooled using the hydraulic oil.

In the driving apparatus for the vehicle according to another aspect of the present advancement, the electric motor preferably includes a first stator fixed to the housing, and a first rotor configured to rotate relative to the first stator and includes a magnet unit. In this case, a second oil passage is provided in the first rotor so that the hydraulic oil cools the magnet unit when centrifugal force acts on the hydraulic oil.

With this configuration, the magnet unit of the first rotor can be suitably cooled using the hydraulic oil.

The driving apparatus for the vehicle according to another aspect of the present advancement preferably further includes a lockup structure configured to connect the impeller and the turbine so that the impeller and the turbine rotates integrally.

Through configuring the torque converter in this way, drive force of the electric motor can be suitably transmitted to the output shaft.

The driving apparatus for the vehicle according to another aspect of the present advancement preferably further includes a rotation transmitting structure. In this case, the rotation transmitting structure is configured to selectively transmit rotation of the first rotor to the output shaft. The torque converter is configured to transmit rotation of the first rotor to the output shaft when the first rotor rotates in a first rotational direction. The rotation transmitting structure transmits rotation of the first rotor to the output shaft when the first rotor rotates in a second rotational direction opposite to the first rotational direction.

With this configuration, rotation of the rotor is transmitted to the output shaft by the torque converter or the rotation transmitting structure depending on the rotational direction of the rotor. As a result, drive force of the electric motor can be suitably transmitted to the output shaft.

The driving apparatus for the vehicle according to another aspect of the present advancement preferably further includes a braking unit. In this case, the braking unit is disposed in the housing. The braking unit brakes rotation of the first rotor. The braking unit includes a third stator fixed to the housing, and a second rotor configured to rotate relative to the third stator and to rotate integrally with the first rotor.

Through configuring the braking unit in this way, the vehicle can be suitably braked.

According to the present advancement, a driving apparatus for a vehicle is capable of guiding hydraulic oil with a simple configuration and can be reduced in size.

DETAILED DESCRIPTION

<Overall Configuration>

Figure 1:
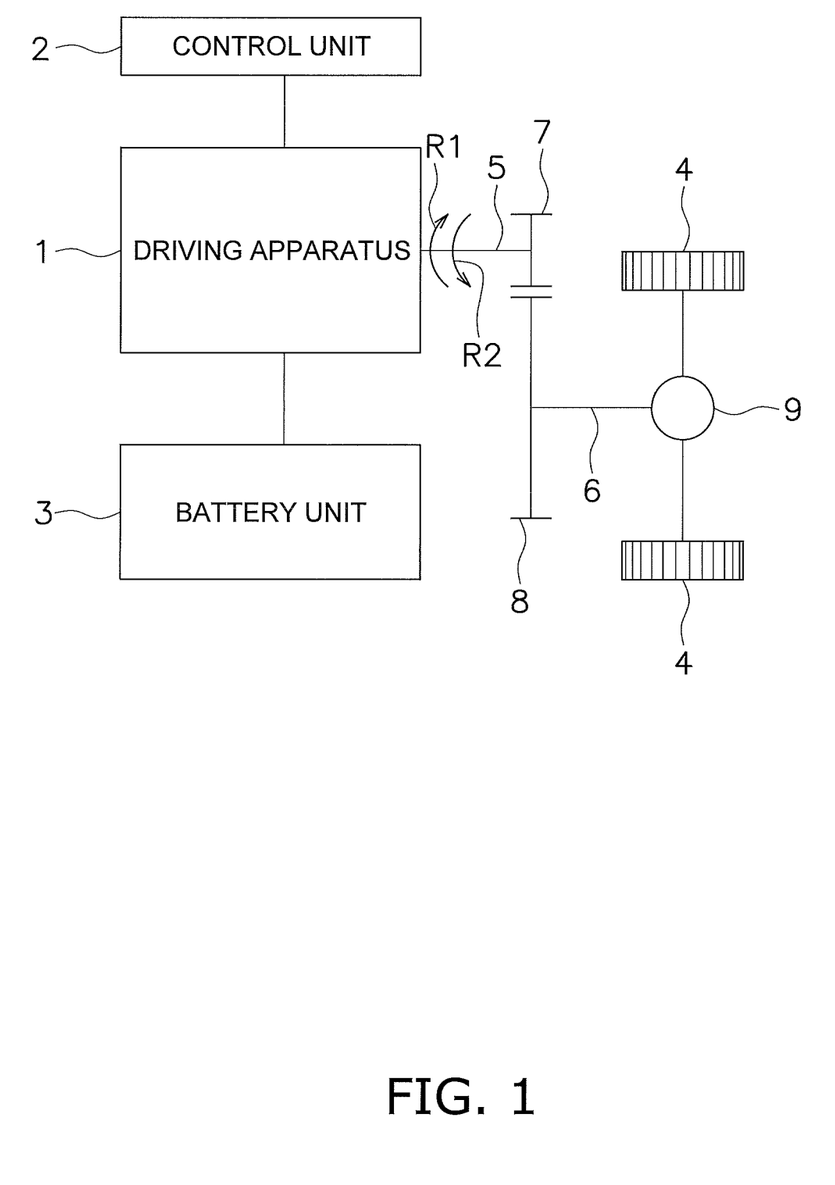
FIG. 1 is a schematic diagram for illustrating the overall configuration of a vehicle according to a first embodiment of the present advancement.

FIG. 1 is a schematic diagram for illustrating the overall configuration of a vehicle provided with a driving apparatus 1 for a vehicle according to the present advancement. Configurations relevant to the driving apparatus 1 are briefly described with reference to FIG. 1.

As illustrated in FIG. 1, the vehicle is provided with, for example, the driving apparatus 1, a control unit 2 and a battery unit 3. In this embodiment, there is described a case in which the control unit 2 and the battery unit 3 are not included in the driving apparatus 1, but the control unit 2 and the battery unit 3 may be included in the driving apparatus 1.

The driving apparatus 1 is a device used for driving a drive wheel 4. The driving apparatus 1 is mounted to a vehicle body (not shown). The driving apparatus 1 operates by being supplied with electric power from the battery unit 3 to drive the drive wheel 4 via a first output shaft 5 (example of an output shaft) and a second output shaft 6. The first output shaft 5 includes a first gear unit 7. The second output shaft 6 includes a second gear unit 8. The second gear unit 8 meshes with the first gear unit 7. A differential mechanism 9 is disposed between the second output shaft 6 and the drive wheel 4.

According to this configuration, when drive force is transmitted from the driving apparatus 1 to the first output shaft 5, the drive force is transmitted from the second output shaft 6 to a drive shaft of the drive wheel 4 via the differential mechanism 9. As a result, the drive wheel 4 is driven by the driving apparatus 1.

Note that the above-described power transmission path is merely an example and another output shaft or gear unit may be further used to transmit the drive force of the driving apparatus 1 to the drive wheel 4. Details of the driving apparatus 1 are described later.

The control unit 2 controls the driving apparatus 1 and the battery unit 3. The control unit 2 is mounted to the vehicle body. The control unit 2 operates by being supplied with electric power from the battery unit 3.

The battery unit 3 supplies electric power to the driving apparatus 1 and the control unit 2. The battery unit 3 is mounted to the vehicle body. The battery unit 3 can be charged by an external power source. The battery unit 3 can also be charged using electric power generated in the driving apparatus 1.

<Driving Apparatus>

Figure 2:
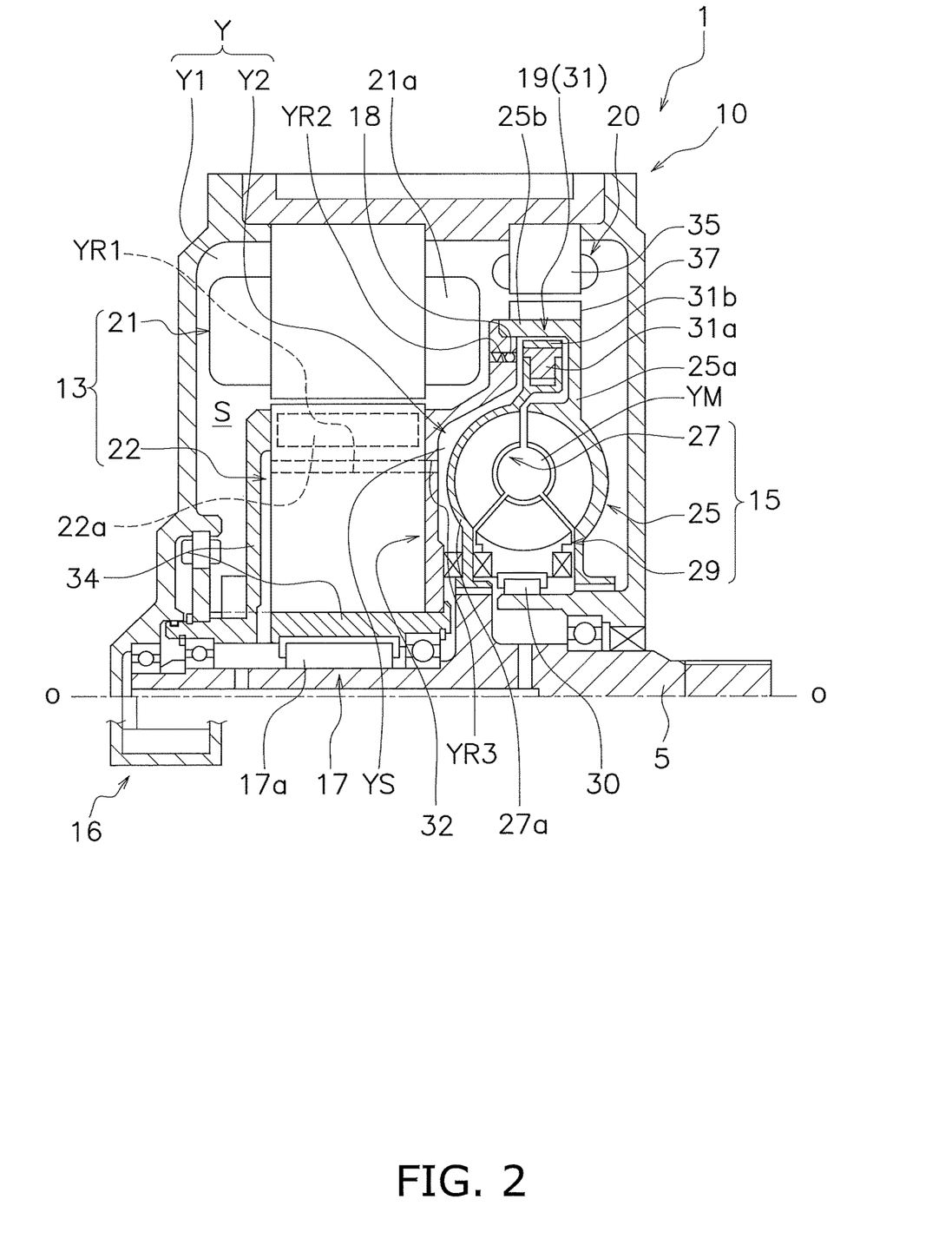
FIG. 2 is a cross-sectional view of a driving apparatus for explaining the configuration.

The driving apparatus 1 is a device used for transmitting drive force to the first output shaft 5. The driving apparatus 1 is formed as one unit and is mounted to the vehicle body. As illustrated in FIG. 2, the driving apparatus 1 includes a housing 10, a motor 13 (example of an electric motor) and a torque converter 15. The driving apparatus 1 further includes a rotation transmitting structure 17, a lockup structure 19 and a retarder 20 (example of a braking unit).

Here, the housing 10, the motor 13, the torque converter 15, an oil reservoir unit 16, the rotation transmitting structure 17, the lockup structure 19 and the retarder 20 are disposed inside the housing 10 to form the housing 10 as one unit.

(Housing)

The housing 10 is attached to the vehicle body. As illustrated in FIGS. 1 and 2, the housing 10 has an internal space S. The housing 10 includes an oil chamber Y and the oil reservoir unit 16. More specifically, the oil chamber Y is located in the internal space S. The oil chamber Y includes a first oil chamber Y1 and a second oil chamber Y2.

The first oil chamber Y1 is located between the housing 10 and a torque converter case 25a, 32 (described later). The second oil chamber Y2 is located inside the torque converter case 25a, 32. The second oil chamber Y2 is formed of a main oil chamber YM and a sub oil chamber YS.

The main oil chamber YM is space inside the torque converter 15, for example, space in which an impeller 25, a turbine 27 and a second stator 29 operate. The sub oil chamber YS is space excluding the main oil chamber YM, for example, space between a turbine shell 27a and a cover unit 32 and space on a radial outer side of the main oil chamber YM.

Hydraulic oil is accumulated in the oil reservoir unit 16. The oil reservoir unit 16 is disposed in the oil chamber Y (internal space S) so as to supply hydraulic oil to the oil chamber Y. More specifically, the oil reservoir unit 16 is provided in the housing 10 so as to supply hydraulic oil to the second oil chamber Y2.

Here, the oil reservoir unit 16 is disposed radially inward of the torque converter 15. The oil reservoir unit 16 supplies hydraulic oil to the second oil chamber Y2 through operation of the torque converter 15. The oil reservoir unit 16 receives hydraulic oil from the first oil chamber Y1.

In this embodiment, there is described a case in which the oil reservoir unit 16 is disposed radially inward of the torque converter 15, but the oil reservoir unit 16 may be disposed at another location as long as the oil reservoir unit 16 can connect with the oil chamber Y.

(Motor)

The motor 13 is a drive unit of the driving apparatus 1. As illustrated in FIG. 2, the motor 13 is disposed in the internal space S in the housing 10. The motor 13 includes a first stator 21 and a first rotor 22. The first stator 21 is fixed to the housing 10. The first stator 21 includes a coil unit 21a.

The first rotor 22 is configured to rotate relative to the first stator 21. The first rotor 22 is rotatably supported by the first output shaft 5. More specifically, the first rotor 22 is rotatably supported by the first output shaft 5 via the rotation transmitting structure 17. The first rotor 22 is positioned in the axial direction by a positioning member 34. The positioning member 34 is mounted to the first rotor 22 so as to rotate integrally with the first rotor 22 and is supported by the first output shaft 5 so as rotate relative to the first output shaft 5. The first rotor 22 includes a magnet unit 22a which has N- and S-poles alternately arranged in the circumferential direction.

An oil passage YR1 (example of a second oil path) is formed in the first rotor 22. More specifically, the oil passage YR1 is formed in the first rotor 22 between the magnet unit 22a and a rotational axis 0 in the radial direction. In this embodiment, the oil passage YR1 extends in the axial direction along the rotational axis 0. The oil passage YR1 is connected to an oil passage YR3 (described later).

Current is supplied from the battery unit 3 to the coil unit 21a of the first stator 21 to generate a magnetic field between the coil unit 21a and the magnet unit 22a. As a result, the first rotor 22 rotates relative to the first stator 21 about a rotational axis of the first output shaft 5. Rotation of the first rotor 22 is controlled by the control unit 2, through controlling of the current supplied from the battery unit 3.

(Torque Converter)

The torque converter 15 transmits drive force of the motor 13 to the first output shaft 5. More specifically, the torque converter 15 transmits rotation of the first rotor 22 to the first output shaft 5 when the first rotor 22 rotates in a drive direction R1 (example of a first rotational direction; see FIG. 1). Here, the drive direction R1 is a direction in which the first rotor 22 is rotated in order to move the vehicle forward.

As illustrated in FIG. 2, the torque converter 15 is disposed inside the housing 10, that is, in the internal space S in the housing 10.

The torque converter 15 guides hydraulic oil from the oil reservoir unit 16 to the second oil chamber Y2 by centrifugal force. In addition, the torque converter 15 supplies hydraulic oil from the second oil chamber Y2 to the first oil chamber Y1.

The torque converter 15 includes the impeller 25, the turbine 27 and the second stator 29. The torque converter 15 transmits torque input to the impeller 25 to the turbine 27 through rotating the impeller 25, the turbine 27 and the second stator 29 using hydraulic oil.

The impeller 25 is configured to rotate integrally with the first rotor 22. For example, the impeller 25 is fixed to the cover unit 32 and the cover unit 32 is fixed to the first rotor 22. An impeller shell 25a of the impeller 25 and the cover unit 32 fixed to the first rotor 22 form torque converter case (example of a case unit). The torque converter case 25a, 32 forms the second oil chamber Y2 (main oil chamber YM and sub oil chamber YS). The torque converter case 25a, 32 is a non-magnetic body.

An oil passage YR2 (example of a first oil passage) and an oil passage YR3 are formed in the torque converter case 25a, 32, for example, the cover unit 32. The oil passage YR2 extends from an inner surface of the cover unit 32 to an outer surface of the cover unit 32. More specifically, the oil passage YR2 extends toward the coil unit 21a of the first stator 21. With this configuration, when centrifugal force acts on the hydraulic oil, the hydraulic oil passes through the oil passage YR2 via a pressure regulating valve 18 to cool the coil unit 21a in the first oil chamber Y1.

The oil passage YR3 extends from the inner surface of the cover unit 32 toward the outer surface of the cover unit 32. More specifically, the oil passage YR3 extends toward the first rotor 22. Even more specifically, the oil passage YR3 extends toward the oil passage YR1 of the first rotor 22 and is connected to the oil passage YR1. Due to this connection, the magnet unit 22a is cooled when hydraulic oil enters the oil passage YR1 from the oil reservoir unit 16 due to centrifugal force. Then, the hydraulic oil in the oil passage YR1 enters the sub oil chamber YS through the oil passage YR3.

The turbine 27 is connected to the first output shaft 5. In this embodiment, the turbine 27 is connected to the first output shaft 5 so as to rotate integrally with the first output shaft 5. The turbine shell 27a of the turbine 27 is disposed between the impeller shell 25a and the cover unit 32. The second stator 29 is configured to rotate relative to the housing 10. For example, the second stator 29 is rotatably disposed in the housing 10 using a one-way clutch 30.

When the torque converter 15 operates, hydraulic oil is sucked up to the second oil chamber Y2 from the oil reservoir unit 16. More specifically, when the impeller 25, the turbine 27 and the second stator 29 rotate due to the torque converter 15 operating, hydraulic oil is sucked up to the main oil chamber YM from the oil reservoir unit 16. Then, the hydraulic oil in the main oil chamber YM passes through a gap between the impeller 25 and the turbine 27 and travels from the centrifugal clutch 31 to the sub oil chamber YS.

Further, when the torque converter 15 operates, hydraulic oil is sucked up to the sub oil chamber YS from the oil reservoir unit 16. In this state, hydraulic oil is supplied from the second oil chamber Y2 (sub oil chamber YS) to the first oil chamber Y1 via the oil passage YR2 that has the pressure regulating valve 18. Details of the flow path on which the hydraulic oil travels, for example, an oil circuit are described later.

In this way, hydraulic oil is guided to the oil reservoir unit 16, the second oil chamber Y2 and the first oil chamber Y1 in that order through the torque converter 15 operating. In other words, the torque converter 15 functions as a pump to allow the hydraulic oil to travel inside the housing 10. Due to the hydraulic oil traveling, each component disposed in the internal space S in the housing 10, for example, the motor 13 can be cooled.

(Pressure Regulating Valve)

The pressure regulating valve 18 is disposed in the torque converter case 25a, 32 (impeller shell 25a and cover unit 32). More specifically, the pressure regulating valve 18 is disposed in the oil passage YR2 that is located in the torque converter case 25a, 32, for example, the cover unit 32. The pressure regulating valve 18 permits or restricts the hydraulic oil from traveling from within the torque converter case 25a, 32 to outside the torque converter case 25a, 32 according to the pressure inside the torque converter case 25a, 32.

More specifically, if the pressure inside the torque converter case 25a, 32, for example, the pressure in the second oil chamber Y2 is higher than the pressure outside the torque converter case 25a, 32, for example the pressure in the first oil chamber Y1, the pressure regulating valve 18 opens the oil passage YR2 and permits the hydraulic oil to travel in the oil passage YR2.

On the other hand, if the pressure inside the torque converter case 25a, 32, for example, the pressure in the second oil chamber Y2 is lower than the pressure outside the torque converter case 25a, 32, for example, the pressure in the first oil chamber Y1, the pressure regulating valve 18 closes the oil passage YR2 and restricts the hydraulic oil from traveling in the oil passage YR2. With this configuration, hydraulic oil can be held inside the torque converter 15, for example, in the second oil chamber Y2 even if the torque converter 15 stops operating.

(Rotation Transmitting Structure)

The rotation transmitting structure 17 selectively transmits rotation of the first rotor 22 to the first output shaft 5. As illustrated in FIG. 2, the rotation transmitting structure 17 is disposed between the first rotor 22 and the first output shaft 5 in the internal space S in the housing 10. For example, the rotation transmitting structure 17 includes a one-way clutch 17a (example of a clutch unit).

For example, when the first rotor 22 rotates in the drive direction R1, the one-way clutch 17a does not transmit rotation of the first rotor 22 to the first output shaft 5. On the other hand, when the first rotor 22 rotates in an anti-drive direction R2 (example of a second rotational direction; see FIG. 1), the one-way clutch 17a transmits rotation of the first rotor 22 to the first output shaft 5. In this embodiment, the anti-drive direction R2 is a rotational direction opposite to the drive direction R1.

(Lockup Structure)

The lockup structure 19 is disposed in the internal space S in the housing 10. The lockup structure 19 connects the impeller 25 and the turbine 27 so that the impeller 25 and the turbine 27 rotate integrally.

In this embodiment, as illustrated in FIG. 2, the lockup structure 19 includes the centrifugal clutch 31. A centrifuge 31a in the centrifugal clutch 31 is mounted in the turbine 27, for example, the turbine shell 27a. More specifically, a plurality of centrifuges 31a which are included in the centrifugal clutch 31 are disposed in the circumferential direction (rotational direction) with intervals therebetween. The plurality of centrifuges 31a are held by the turbine shell 27a so as to move in a radial direction and to rotate integrally with the turbine shell 27a.

The plurality of centrifuges 31a are disposed opposing a radial direction outer side portion 25b of the impeller shell 25a. Each of the plurality of centrifuges 31a includes a friction member 31b. The friction members 31b of the centrifuges 31a are each disposed at an interval from the radial direction outer side portion 25b of the impeller shell 25a.

More specifically, if centrifugal force is not acting on the plurality of centrifuges 31a, or the centrifugal force acting on the plurality of centrifuges 31a is less than a predetermined centrifugal force, the plurality of centrifuges 31a (friction members 31b) are disposed at an interval from the radial direction outer side portion 25b of the impeller shell 25a. This state is a "clutch off" state.

On the other hand, a state in which the friction member 31b of each centrifuge 31a abuts against the radial direction outer side portion 25b of the impeller shell 25a is a "clutch on" state. More specifically, if the centrifugal force acting on the plurality of centrifuges 31a is more than or equal to a predetermined centrifugal force, the plurality of centrifuges 31a (friction members 31b) abut against the radial direction outer side portion 25b of the impeller shell 25a. With this configuration, the impeller 25 and the turbine 27 are connected to each other so that the impeller 25 and the turbine 27 rotate integrally. This state is the clutch on state.

(Retarder)

The retarder 20 brakes rotation of the first rotor 22. The retarder 20 generates braking force using electromagnetic induction. As illustrated in FIG. 2, the retarder 20 is disposed in the housing 10. More specifically, the retarder 20 is disposed in the internal space S in the housing 10.

The retarder 20 includes a third stator 35 and a second rotor 37. The third stator 35 is fixed to the housing 10. The second rotor 37 is configured to rotate relative to the third stator 35. Further, the second rotor 37 is configured to rotate integrally with the first rotor 22.

In this embodiment, the second rotor 37 is fixed to the impeller shell 25a (radial direction outer side portion 25b). As described above, the impeller shell 25a rotates integrally with the first rotor 22 via the cover unit 32, and hence the second rotor 37 rotates integrally with the first rotor 22 via the impeller shell 25a and the cover unit 32.

Under a state in which current is supplied from the battery unit 3 to the third stator 35 to form a magnetic field between the third stator 35 and the second rotor 37, an eddy current is generated when the second rotor 37 rotates relative to the third stator 35. This generated eddy current causes electrical resistance to become torque resistance, that is, braking force.

Here, the braking force is controlled, by the control unit 2, through controlling the current supplied from the battery unit 3 to the third stator 35. For example, if the battery unit 3 is fully charged (the battery unit 3 cannot be charged), braking force of the retarder 20 is used because it is difficult to use the motor 13 as a regenerative brake.

In this case, current is supplied from the battery unit 3 to the third stator 35. Then, when the second rotor 37 which rotates integrally with the first rotor 22 rotates with respect to the third stator 35, rotation of the second rotor 37 is braked. In other words, rotation of the first rotor 22 is braked through braking rotation of the second rotor 37.

When the retarder 20 is operated as described above, the charged amount of the battery unit 3 reduces. When the battery unit 3 can be charged again due to the charged amount reducing, operation of the retarder 20 is stopped and the motor 13 is used as a regenerative brake.

When the motor 13 is used as a regenerative brake, the supply of electric power from the battery unit 3 to the motor 13 is stopped. Then, the first rotor 22 of the motor 13 rotates relative to the first stator 21. As a result, the motor 13 functions as both a generator and a braking unit. Because of this, the battery unit 3 is charged and rotation of the first rotor 22 in the motor 13 is braked.

Note that, when the battery unit 3 can be charged, braking force of both the motor 13 and the retarder 20 may be simultaneously used. Further, in this case, only braking force of the retarder 20 may be used without generating braking force in the motor 13.

The above-mentioned state of charge of the battery unit 3 is monitored by the control unit 2. In this state, if, for example, drive of the motor 13 is stopped on the basis of a command from the control unit 2, the control unit 2 determines whether or not to use braking force of the motor 13 and/or braking force of the retarder 20 according to the above-mentioned state of charge of the battery unit 3.

(Oil Circuit for Hydraulic Oil)

Figure 3:
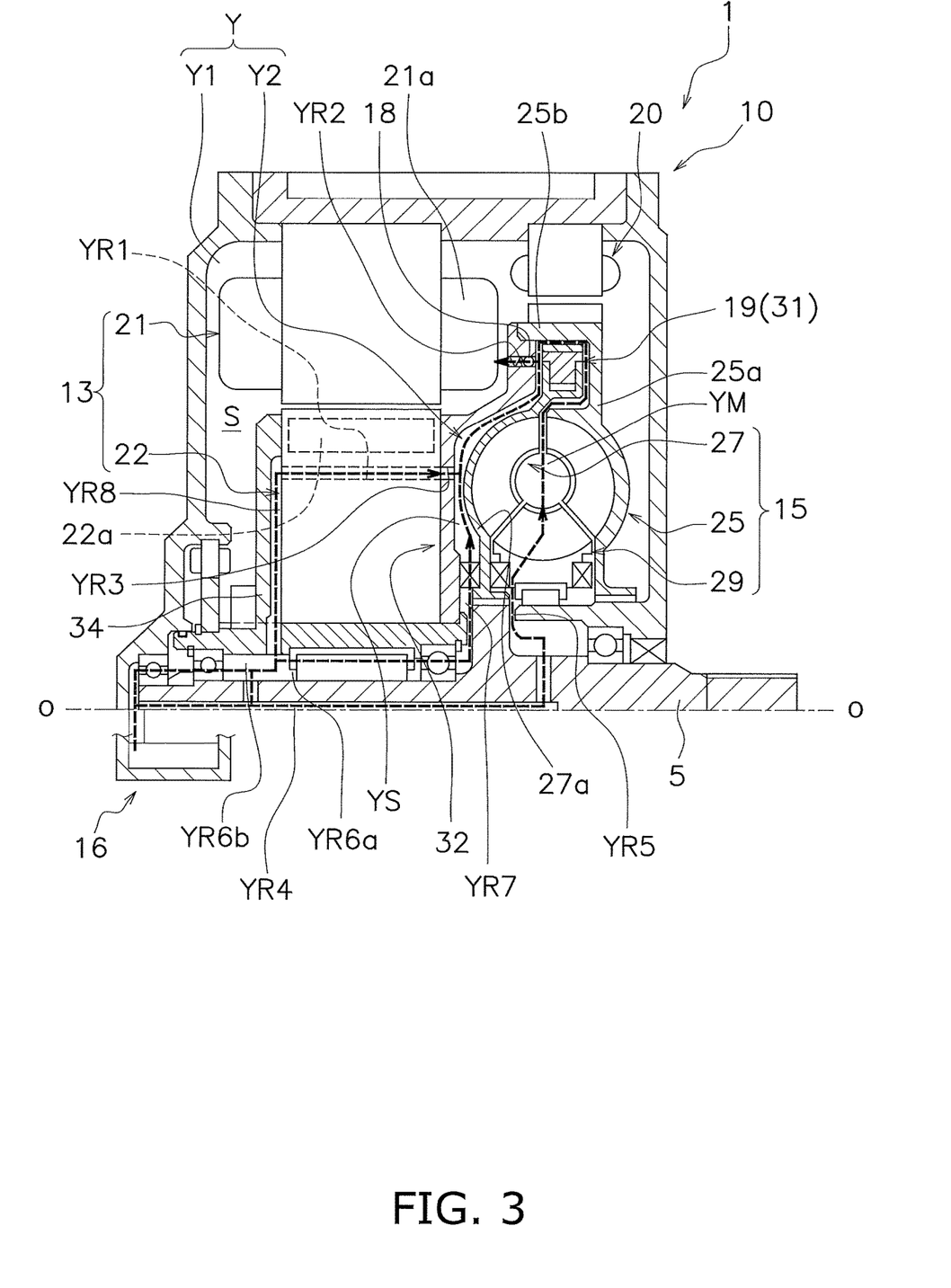
FIG. 3 is a cross-sectional view of the driving apparatus for explaining an oil circuit.

As illustrated in FIG. 3, when the torque converter 15 operates and centrifugal force acts on the hydraulic oil, the hydraulic oil is first guided from the oil reservoir unit 16 to the second oil chamber Y2 (main oil chamber YM and sub oil chamber YS).

More specifically, the hydraulic oil travels from the oil reservoir unit 16 and passes through an oil passage YR4 in the first output shaft 5 and an oil passage YR5 between the first output shaft 5 and the housing 10 to reach the inside of the main oil chamber YM. The hydraulic oil in the main oil chamber YM can travel from the centrifugal clutch 31 to inside the sub oil chamber YS.

Further, the hydraulic oil travels from the oil reservoir unit 16 and passes through oil passages YR6a and YR6b between the first output shaft 5 and the first rotor 22 and an oil passage YR7 between the cover unit 32 and the turbine shell 27a to reach the inside of the sub oil chamber YS.

In addition, the hydraulic oil travels from the oil reservoir unit 16 and passes through the oil passage YR6b between the first output shaft 5 and the positioning member 34, the oil passage YR8, the oil passage YR1 and the oil passage YR3 between the first rotor 22 and the positioning member 34, to reach the inside of the sub oil chamber YS. At this time, the magnet unit 22a of the first rotor 22 is cooled by the hydraulic oil.

Next, when the centrifugal force increases and the pressure in the second oil chamber Y2 (main oil chamber YM and sub oil chamber YS) increases, the pressure regulating valve 18 opens. Then, the hydraulic oil is guided to the first oil chamber Y1 from the second oil chamber Y2 via the oil passage YR2. With this configuration, the coil unit 21a of the first stator 21 is cooled by the hydraulic oil.

Note that the pressure regulating valve 18 closes if, for example, operation of the torque converter 15 stops and the pressure in the second oil chamber Y2 (main oil chamber YM and sub oil chamber YS) decreases. As a result, the hydraulic oil stops traveling from the second oil chamber Y2 to the first oil chamber Y1 and the second oil chamber Y2 is sealed by the pressure regulating valve 18.

<Summary>

Through configuring the driving apparatus 1 as described above, hydraulic oil can be guided to the oil reservoir unit 16, the second oil chamber Y2 and the first oil chamber Y1 in that order. In this way, with the driving apparatus 1, hydraulic oil can be guided without the need to prepare, for example, a pump and a control device for the pump. In other words, with the driving apparatus 1, hydraulic oil can be guided with a simple configuration and the device can be reduced in size.

In addition, through configuring the driving apparatus 1 as described above, rotation of the first rotor 22 is braked by at least one of the motor 13 and the retarder 20. Because of this, if, for example, it is difficult to brake rotation of the first rotor 22 in the motor 13, rotation of the first rotor 22 can be braked using the retarder 20. In this way, rotation of the first rotor 22, that is, rotation output from the motor 13 can be suitably braked using the above-described driving apparatus 1.

In addition, through configuring the driving apparatus 1 as described above, when the first rotor 22 rotates in the drive direction R1, rotation of the first rotor 22 is transmitted to the first output shaft 5 via the torque converter 15. On the other hand, when the first rotor 22 rotates in the anti-drive direction R2, rotation of the first rotor 22 is transmitted to the first output shaft 5 via the rotation transmitting structure 17, for example, the one-way clutch 17a. In other words, with the driving apparatus 1, rotation of the first rotor 22 is transmitted to the first output shaft 5 by either the torque converter 15 or the rotation transmitting structure 17 (one-way clutch 17a) depending on the rotational direction of the first rotor 22. With this configuration, the drive force of the motor 13 can be suitably transmitted to the first output shaft 5.

Other Embodiments

The present advancement is not limited to the above-described embodiment and may be changed or altered in various ways without departing from the scope of the present advancement.

(A) In the above-described embodiment, there is described an example in which the turbine 27 rotates integrally with the first output shaft 5. Alternatively, the turbine 27 may be configured to rotate integrally with the first output shaft 5 in the drive direction R1 and to rotate with respect to the first output shaft 5 in the anti-drive direction R2. This configuration can be implemented by, for example, disposing the one-way clutch between the turbine 27 and the first output shaft 5.

(B) In the above-described embodiment, there is described an example in which the lockup structure 19 includes the centrifugal clutch 31. However, the lockup structure 19 may have another structure in which the impeller 25 and the turbine 27 can be connected/unconnected as described above. For example, each of the plurality of centrifuges 31a may be swingably held by the turbine shell 27a.

REFERENCE SYMBOLS LIST 1 driving apparatus
5 first output shaft
10 housing
13 motor
15 torque converter
17 rotation transmitting structure
17a one-way clutch
16 oil reservoir unit
18 pressure regulating valve
19 lockup structure
21 first stator
22 first rotor
20 retarder
35 third stator
37 second rotor
Y oil chamber
Y1 first oil chamber
Y2 second oil chamber
YM main oil chamber
YS sub oil chamber
YR1 to YR8 oil passage

What is claimed is:

1. A driving apparatus for a vehicle for transmitting drive force to an output shaft, the driving apparatus comprising:
   a housing including a first oil chamber, a second oil chamber and an oil reservoir unit;
   an electric motor disposed in the first oil chamber; and
   a torque converter including a case unit that forms the second oil chamber, the torque converter configured to transmit drive force of the electric motor to the output shaft,
   the torque converter configured to guide hydraulic oil from the oil reservoir unit to the second oil chamber by centrifugal force, and
   a first oil passage that allows the hydraulic oil to pass from the second oil chamber to the first oil chamber is formed in the case unit.

2. The driving apparatus for a vehicle according to claim 1, wherein
   a pressure regulating valve is provided in the first oil passage, and
   the pressure regulating valve permits or restricts passage of the hydraulic oil in the first oil passage according to pressure inside the second oil chamber.

3. The driving apparatus for a vehicle according to claim 2, wherein the electric motor includes a first stator fixed to the housing and a first rotor configured to rotate relative to the first stator, the first stator including a coil unit, and the first oil passage is formed in the case unit so that the hydraulic oil cools the coil unit when centrifugal force acts on the hydraulic oil.

4. The driving apparatus for a vehicle according to claim 2, wherein the electric motor includes a first stator fixed to the housing; and a first rotor configured to rotate relative to the first stator, the first rotor including a magnet unit, and a second oil passage is provided in the first rotor so that the hydraulic oil cools the magnet unit when centrifugal force acts on the hydraulic oil.

5. The driving apparatus for a vehicle according to claim 1, wherein the electric motor includes a first stator fixed to the housing and a first rotor configured to rotate relative to the first stator, and the torque converter includes an impeller configured to rotate integrally with the first rotor; a turbine connected to the output shaft; and a second stator configured to rotate relative to the housing.

6. The driving apparatus for a vehicle according to claim 5, further comprising;

a lockup structure configured to connect the impeller and the turbine so that the impeller and the turbine rotate integrally.

7. The driving apparatus for a vehicle according to claim 5, further comprising a rotation transmitting structure configured to selectively transmit rotation of the first rotor to the output shaft, wherein the torque converter is configured to transmit rotation of the first rotor to the output shaft when the first rotor rotates in a first rotational direction, and the rotation transmitting structure transmits rotation of the first rotor to the output shaft when the first rotor rotates in a second rotational direction opposite to the first rotational direction.

8. The driving apparatus for a vehicle according to claim 5, further comprising a braking unit disposed in the housing and configured to brake rotation of the first rotor, wherein the braking unit includes a third stator fixed to the housing, and a second rotor configured to rotate relative to the third stator and rotate integrally with the first rotor.

* * * * *